(12) United States Patent
Rasti

(10) Patent No.: US 8,281,145 B2
(45) Date of Patent: *Oct. 2, 2012

(54) DOING BUSINESS WITHOUT SSN, EIN, AND CHARGE CARD NUMBERS

(76) Inventor: Mehran Randall Rasti, Baton Rouge, LA (US)

( * ) Notice: Subject to any disclaimer, the term of this patent is extended or adjusted under 35 U.S.C. 154(b) by 862 days.

This patent is subject to a terminal disclaimer.

(21) Appl. No.: 11/957,266

(22) Filed: Dec. 14, 2007

(65) Prior Publication Data

US 2009/0158030 A1 Jun. 18, 2009

(51) Int. Cl.
*H04L 9/32* (2006.01)
*G06F 21/00* (2006.01)
*G06F 7/04* (2006.01)
*G06Q 20/00* (2012.01)

(52) U.S. Cl. ............ 713/182; 713/168; 726/28; 705/64

(58) Field of Classification Search .......... 713/150–153, 713/155–156, 159, 164–173, 175, 180, 182–186, 713/193; 726/2–10, 26–30; 705/50–51, 705/55–56, 64–67, 70–76
See application file for complete search history.

(56) References Cited

U.S. PATENT DOCUMENTS

| | | | | |
|---|---|---|---|---|
| 4,214,230 A | * | 7/1980 | Fak et al. | 235/380 |
| 6,463,533 B1 | * | 10/2002 | Calamera et al. | 713/163 |
| 7,200,756 B2 | * | 4/2007 | Griffin et al. | 713/189 |
| 7,613,919 B2 | * | 11/2009 | Bagley | 713/155 |
| 7,788,501 B2 | * | 8/2010 | Abdallah et al. | 713/186 |
| 7,805,378 B2 | * | 9/2010 | Berardi et al. | 705/67 |
| 8,160,960 B1 | * | 4/2012 | Fei et al. | 705/39 |
| 2001/0037316 A1 | * | 11/2001 | Shiloh | 705/74 |
| 2001/0044785 A1 | * | 11/2001 | Stolfo et al. | 705/74 |
| 2002/0077964 A1 | * | 6/2002 | Brody et al. | 705/38 |
| 2002/0116509 A1 | * | 8/2002 | DeLaHuerga | 709/229 |
| 2002/0174344 A1 | * | 11/2002 | Ting | 713/185 |
| 2003/0038707 A1 | * | 2/2003 | Geller | 340/5.8 |
| 2003/0061168 A1 | * | 3/2003 | Routhenstein | 705/64 |
| 2003/0120608 A1 | * | 6/2003 | Pereyra | 705/64 |
| 2003/0158960 A1 | * | 8/2003 | Engberg | 709/237 |
| 2003/0195857 A1 | * | 10/2003 | Acquisti | 705/74 |
| 2003/0212904 A1 | * | 11/2003 | Randle et al. | 713/200 |
| 2004/0083184 A1 | * | 4/2004 | Tsuei et al. | 705/74 |
| 2004/0123159 A1 | * | 6/2004 | Kerstens et al. | 713/202 |
| 2004/0172293 A1 | * | 9/2004 | Bruschi et al. | 705/2 |
| 2004/0260646 A1 | * | 12/2004 | Berardi et al. | 705/39 |
| 2004/0260653 A1 | * | 12/2004 | Tsuei et al. | 705/54 |
| 2005/0273842 A1 | * | 12/2005 | Wright et al. | 726/1 |
| 2006/0174349 A1 | * | 8/2006 | Cronce et al. | 726/26 |
| 2007/0261114 A1 | * | 11/2007 | Pomerantsev | 726/12 |
| 2008/0040784 A1 | * | 2/2008 | Salva Calcagno | 726/9 |
| 2008/0184351 A1 | * | 7/2008 | Gephart et al. | 726/7 |

OTHER PUBLICATIONS

Schartner, Peter, "Unique User-Generated Digital Pseudonyms," 2005, Springer-Verlag Berlin Heidelberg, vol. 3685, pp. 194-205.*

* cited by examiner

Primary Examiner — Darren B Schwartz (57) ABSTRACT

The present invention introduces encrypted identifiers to be used when the owner of an identifier wants to hide the original identifier away from public exposure but still be able to be uniquely identified through the encrypted form of the identifier. The encrypted proxy identifiers are generated using a Rule Number that references a user-specific algorithm and encryption key that is different for every user. One or more identity-owner-specific passwords are also utilized.

26 Claims, 6 Drawing Sheets

Checking out a customer's credit bureau data using ProxySSN, or other Proxy Ids.

Figure-1: Checking out a customer's credit bureau data using ProxySSN, or other Proxy Ids.

Figure-2: Merchant-encrypted PxySSN, PxyEIN, or other Pxy IDs are used to check a person's credit/ID.

Figure-3: Credit Bureau itself can process a customer's data by using PxySSN, or other Pxy Ids.

Figure-4: Charging a purchase with Pxy Charge Card Numbers that change with every merchant.

Figure-5

✛ Symbol indicates encryption. X, Y, and Z Files are extracted from a person's "Identity Matrix". Z-File is a User Assigned (algorithm) Rule No. Any one of the Id's from X-File is encrypted with Y-File Identity-Password(s) and a User Assigned Rule No. to form a Pxy (encrypted) form of an object or identity identifier.

Figure-6

DOING BUSINESS WITHOUT SSN, EIN, AND CHARGE CARD NUMBERS

CROSS REFERENCE TO RELATED APPLICATIONS

This application and the applicant claim the benefit of the following previously filed U.S. patent application:
Ser. No. 11/506,476 Aug. 19, 2006 Mehran R. Rasti

FEDERALLY SPONSORED RESEARCH OR DEVELOPMENT

None.

REFERENCES TO SEQUENCE LISTING, TABLES, OR COMPUTER PROGRAMS

None.

THE NAMES OF PARTIES TO A JOINT RESEARCH AGREEMENT

None.

BACKGROUND OF THE INVENTION

1. Field of Invention

Personal identification identifiers, such as the social security number, finger print, or retina patterns, are of fixed nature; meaning, they stay on records and with a person for life. Therefore they need to be protected. However, in the information age, during course of time, and with constant use, such fixed data become exposed, and in essence will fall in the public domain; they loose their secrecy and become known to the public, and this feeds and encourages identity theft. This invention introduces a changeable substitution number or code to replace such fixed identity identifiers in accordance to who uses it. When a person's identity identifier changes, that person will no longer be track-able through his/her old identity-number (identifier) on record and given the time, the person's recorded information becomes obsolete and unusable for the most part. This invention lets a user organization of a person's identifier (SSN) to work with a proxy SSN of their own for their internal use while still be able to obtain credit and historical information on the person when needed. Therefore without having sacrificed functionality, a person's original identifier remains hidden from the eyes of the user-organization employees and customer-service-agents. Through this, the chances of identity theft will diminish with time.

The same method and procedure can be applied to safe-guard and authenticate other identifiers that do not directly identify a person. Examples are EIN, Product Serial Numbers, Software Licenses, door access codes, and credit card numbers. These too, can be altered and tailored for each user through a dedicated user or merchant schema (Rule Number).

2. Status of Prior Art

On May 16, 2005 through U.S. patent application Ser. No. 11/129,827 the inventor introduced the concept of Identity Matrix that allocates passwords to Social Security Numbers and other identifiers including Charge Card Numbers in a Matrix to be authenticated in a three-way relationship through "comparison". On Aug. 23, 2005, through U.S. Provisional Patent Application No. 60/710,693 the same inventor introduces "standard-made-up-social security number" or SMSSN that in essence are merchant specific proxy social security numbers as that being resented in this patent application.

On Aug. 19, 2006 through U.S. patent application Ser. No. 11/506,476 this inventor takes the previous application further by introducing a third parameter in Identity Matrix and calls it a preset "rule", or values of "rule-flag". The rule flag takes the simple "comparison" method of his previous patent application one step further and expands it to any complex computerized based algorithm taking advantage of various possible relationships that can be established amongst the various elements existing in an Identity Matrix.

This application expands the same concepts of previous 3 patent applications and introduces encrypted instances of proxy forms of identifiers that are referred to as "Pxy" forms of various identifiers such; for example, a "PxySsn" represents an encrypted Social Security Number, and so on. These are generated on-the-fly by applying user-specific Rule Numbers along with other preloaded elements out of a person's Identity Matrix.

The Rule Numbers provide reference to an associated computer based algorithm that encrypts the original identifier.

BRIEF SUMMARY OF THE INVENTION

1. A private enterprise, a credit bureau, or a mandated governmental agency hereafter referred to as the "trustee" would issue and support unique "identity-identifiers".
2. For the purpose of this document, identifiers refer to strings of numbers or character code that designates and references a person, a thing, or a service. Such identifiers include, but are not limited to Social Security Number, (SSN), Employer Identification Number (EIN), National/Federal Identity Number (Id Number), and so on. These and similar identifiers are identity-identifiers. There are also non-identity-identifiers such as charge card numbers, software usage serial numbers, item serial numbers, student numbers, prescription numbers, patient numbers, insurance numbers and the like. In this document, all identifiers, identity or not, are collectively and individually referred to as "identifier". The invention introduces its own identifiers using names like ProxySsn, ProxyEIN, Proxyld, ProxyCC, for Proxy Charge Card Numbers, and the like. For purposes of this document, the latter groups of identifiers are collectively referred to as Proxy forms of the identifier. When written without the prefix of "Proxy", the name gives a clue to the kind of the identifier we refer to. For example, a ProxySsn references SSN. This Proxy form is a substitution number or a string of code that links to and references one's SSN. Further on we explain methods with which we can put Proxy identifiers to useful use. In addition to "proxy type" of identifiers, the invention also introduces and makes use of "Pxy type" of identifiers. A Pxy type of an identifier is a specially encrypted form of any of the above mentioned identifiers. For example, PxySsn is an encrypted form of the original/raw SSN it references. A Pxy identifier is made by applying a "user" specific-encryption-key and algorithm combination and other variables as we discuss later. Here, for short we refer to this combination simply as "merchant or user Rule-No. When decrypted, using the same user Rule-No., along with reversed (decryption) algorithms, a PxySsn would yield back its original SSN. Likewise, any other Pxy form of an identifier would yield original "value" of the identifier it originated from. See FIG. 5, and FIG. 6.
3. The "trustee" organization is responsible for issuing, safe-keeping, a maintaining, designing, managing, and distributing Proxy and Pxy identifiers. In addition, the trustee shall provide reasonably uninterrupted access for an identity owner to change his/her Proxy identifier(s), around the clock, with 90% or better up-time, and will provide accounts, facilities, data, and code for production and verification of Pxy identifiers it has originated.

4. An "owner" of an identifier seeking to reasonably protect a raw/original identifier requests Proxy or Pxy account and numbers from the "trustee". See Event Label 1 in FIGS. 1, 2, 3, and 4.

5. Upon examination and validation of the submitted application form and proof of ownership to the identifier, the trustee will issue and assign a Proxy identifier or a Pxy account for the submitted original identifier; see Event Label 2 in FIGS. 1,2,3, and 4. Through a Pxy account, the trustee will supply the "owner" with a portable device to enable its owner to generate Pxy type of the identifier as they are needed; Alternatively a removable memory card/module is issued so that the user can plug it in specially designed cell phones or other devices that may also exist at the "user" site. Such a cartridge or memory module contains executable code and binary data necessary in for generating a user-specific Pxy code. The device, cartridge, or the memory module stores has in its storage what is called "Identity Matrix".

6. Upon completion of registration process, the trustee will upload the new Proxy and/or Pxy identifiers, and related algorithms, and encryption keys to those credit bureaus the trustee has an active contract with. See Event Label 3 in FIGS. 1, and 2. Alternately a credit bureau in contract with the trustee may download the new applicant's Proxy and/or Pxy identifiers along with other relevant data, as seen under Event Label 3 in FIG. 3.

Figure 4:
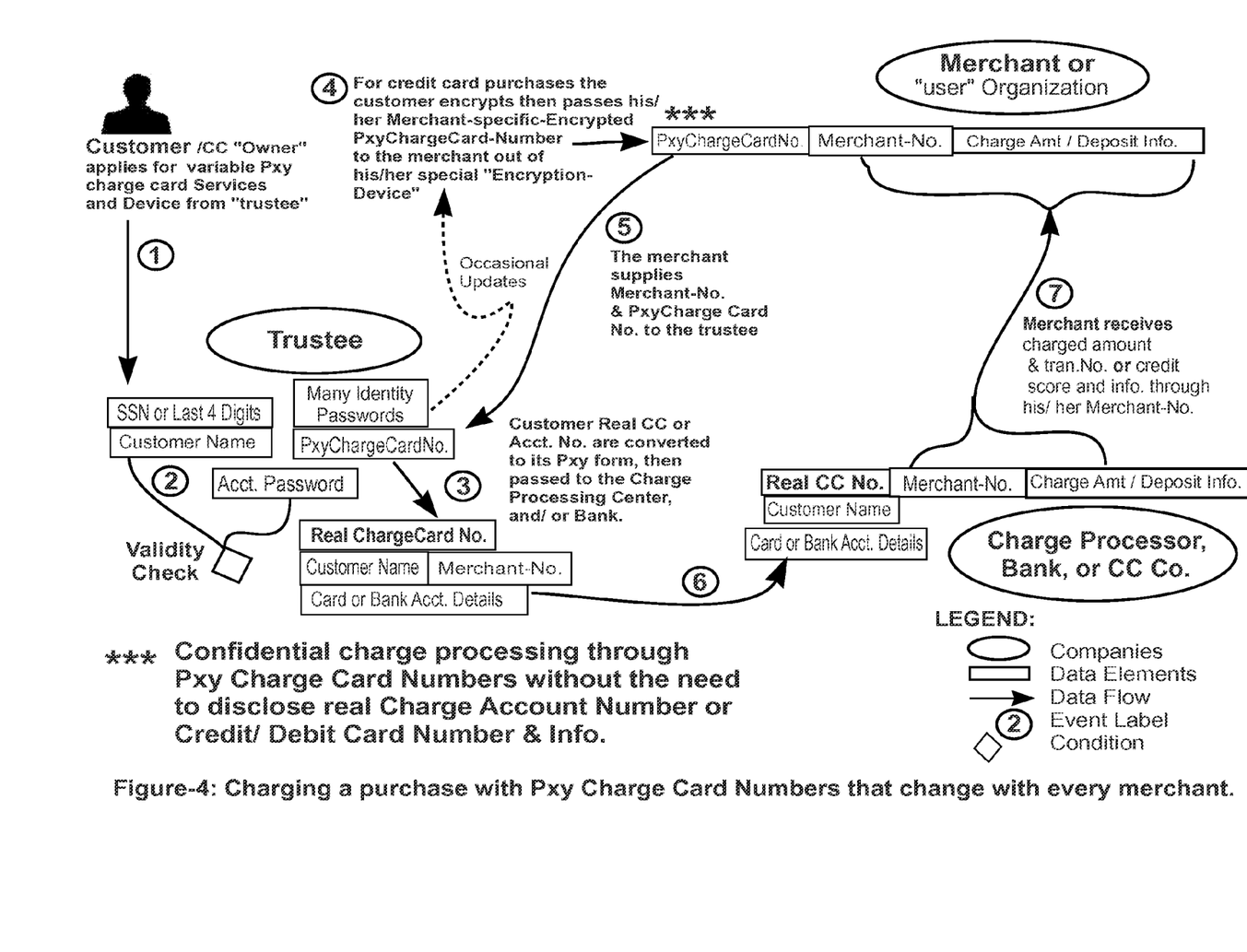
FIG. 4: Process flow diagram by which a Charge Processing Center processes "Pxy Charge Card Account Numbers" by offering to its customer the option to hide a charge account or credit/debit card numbers.
Figure 5:
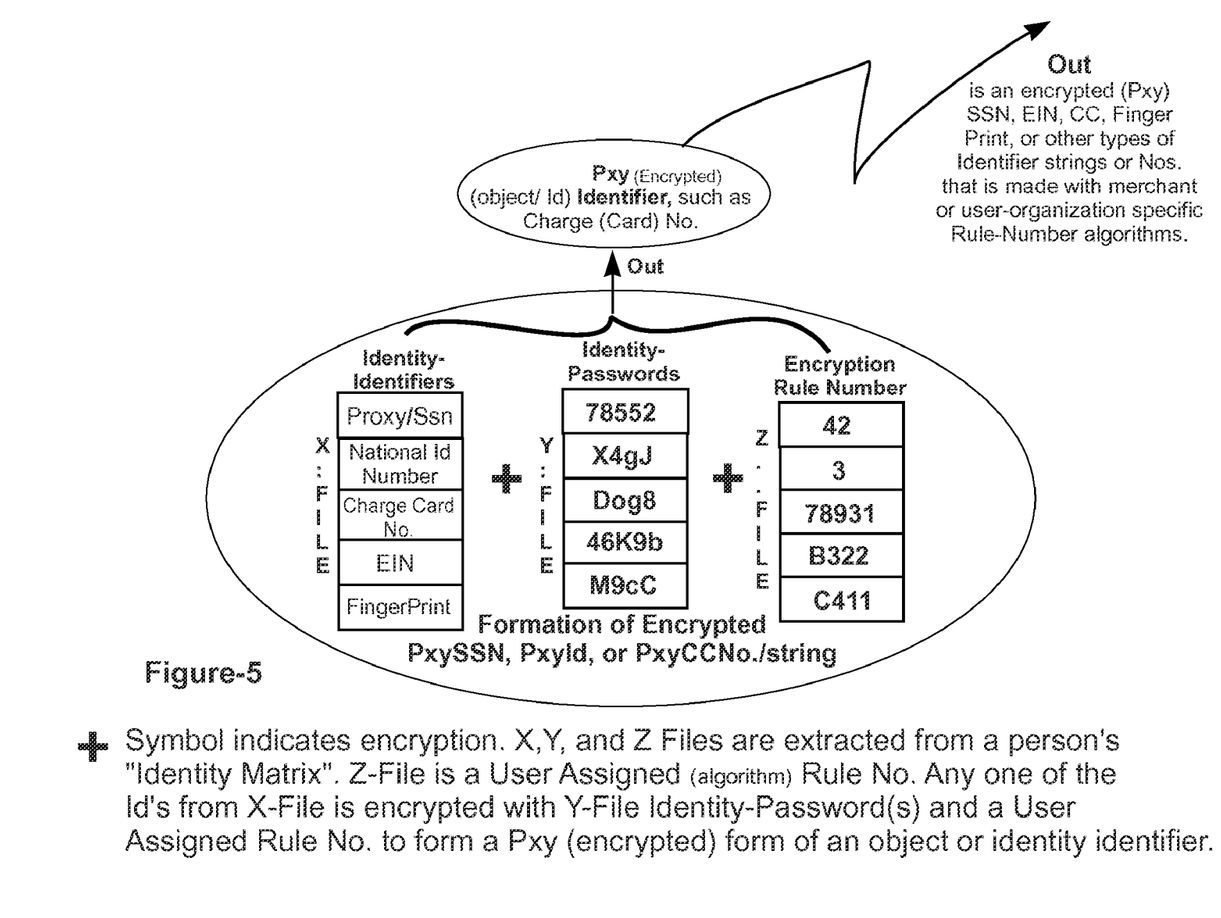
FIG. 5: Process flow diagram by which various elements from X, Y, and Z files within an Identity Matrix are used, where Y file supplies the passwords to be combined with any of the identifiers in the X file, and Rule Number in Z file, thus making the encrypted product to be user/merchant specific.

7. When an identity owner seeks credit or other kinds of services from a merchant, a business, or an organization ("user" of identity identifier) he/she can provide the merchant with a Pxy or Proxy type of an identity identifier in lieu of the his/her original one. See Event Label 4 in FIGS. 1, 2, 3, and 4. If the person is using a Pxy type of an identifier he/she would need a "Pxy encoder device" so that the elements present in the owner's Identity Matrix can be encoded with a user-specific user Rule-No. in order to produce an "on-the-fly" Pxy identifier. See FIG. 5. The user Rule Number dictates which of the pre-stored user-specific-encryption-key and algorithm combinations are to be used in order to produce a "user specific" instance of a Pxy identifier. This is Event Label 4 in FIGS. 1, 2, 3 and 4. In FIG. 5 we show that a Pxy identifier is produced out of the owner's Identity Matrix when one of the owner's identifiers is used with one of the Identity Passwords and a user-specific Rule Number.

SSN Passwords, identity password assignment to credit cards, and the concept of Identity Matrix and applications that have previously been filed by the same inventor in his previous US Patent Applications as referenced in "Cross Reference" section of this application makes it possible to generate a Pxy forms of identifiers that are hard to guess and predict by everyday users in an organization or a corporation. See FIG. 6; decryption.

8. In order to access a variety of historical, credit, and financial information that is compiled by credit bureaus, a user merchant or organization then passes a Pxy or Proxy identifier code of the identifier owner, along with the its own merchant/contract number to a credit bureau they work with. This includes, as usual, payment and other needed data for the credit bureau to fill its client's information request. See Event Label 5 in FIGS. 1, 2, and 3.

9. The credit bureau will then match the identity owner's Proxy or Pxy identifier with an owner's raw/original identifier via a cross-referencing table, and extracts and submits the requested information for the user business or organization requestor. See Event Label 6 in FIGS. 1, 2, 3, and 4. FIG. 4 specifies a minor deviation for processing a Proxy or Pxy charge card number, in which the credit bureau is replaced with a different entity that processes credit, debit, and charge account requests.

DETAILED DESCRIPTION OF THE INVENTION

A. List of Components and Methods

The invention makes use of the following objects and methods:

1 An "identifier" that identifies a person, an organization, a thing, or a service.

2 An organization named "trustee".

3 The identity "owner"; a person who is the owner of an identifier or who has officially been charged to act upon the ownership of an identifier as an owner. This person must have the intention of protecting the identifier; to keep it safe and protect it from being misused or fall into the wrong hands.

4 Proxy or substitution objects capable of masking the "face" of the original identifier without hampering its functionality.

5 Methods with which to "mask" and "unmask" the said identifier objects; to protect them by hiding their "face" in such a way for such objects to still be capable of referencing the owner of such an identifier either by reference or through the original "face" it had before masking.

B. Identifiers and Identifier Types

Identifiers as defined in this document refer to strings of numbers, characters, and/or code that designate and reference a person, an organization, a thing, or a service.

There is a class of identifiers that identify a unique individual or a company. We refer to such identifiers as identity-identifiers. These include, but not limited to Social Security Number, (SSN), Employer Identification Number (EIN), National/Federal Identity Number (Id Number), Student Number, Patient Number, and the like.

A second class of identifiers does not identify a person or, a company directly, but they do so indirectly. Examples are insurance policy number, health insurance number, prescription number, bank account number, credit card number, software license number, a door-access-code, and so on. In this document we refer to all identifiers, identity or not, collectively as "identifier(s)" The words "identity-identifier", "identifier", or "identity" may have been used interchangeably in order to make the description more clear. Likewise, words like "identity number", "identity code", "identity number/code", and "identity code/number" shall reflect the same string consisting of alpha-numeric characters that may also include any character from the ASCII, Unicode, Extended Unicode, and all possible graphic and non-graphic characters from any language set that a computer is capable of processing when in machine code.

The invention introduces and applies some new prefixes to already familiar identifiers. The prefixes are named "Proxy" and "Pxy". Proxy identifiers are changeable, substitution identifiers to work in place of their original counterparts. The name of a Proxy identifier is followed by a suffix to indicate its "parent"; the parent identifier is the one that we are trying to protect from eyes of the public and hide it from those who work with it, without impeding or stopping the work or the business functions that have to take place. For ease of communication we have assigned some names to the more commonly used identifiers that we have addressed in this document. These are ProxySsn or PxySsn to work as substitutes for someone's SSN. ProxyEIN or PxyEIN for a company's EIN identifier; A Proxy of someone's National or Federal identifier number is referred to as ProxyId, or PxyId. Likewise, PxyCC represents an encrypted form of a Charge account number that includes a Credit/Debit Card Number or a Charge Number. A trustee may handle more Pxy and Proxy names, but the principals by which such identifiers function are those that are described in this application. To maintain confidentiality of the original/raw identifier, Proxy and Pxy types of identifiers must be "changeable" by their "owner". Owner is a person who has ownership rights to a specific identifier or has been granted the official delegation/rights of acting in the capacity of an "owner". The difference between a Proxy type of an identifier versus a Pxy identifier is that Proxy identifiers must be changed manually through a request by their "owner"; whereas with Pxy type of identifiers such a change occurs automatically through their use. Change of Proxy identifiers may be facilitated through the (web) facilities of the trustee who is the custodian and is acting as the maintenance organization for such identifiers. However, for Pxy identifiers, while a user may still use the trustee's web facilities to apply, changes to the face of this type of identifier occurs automatically via methods and processes that are discussed in section G of this document and can include some variations in implementation depending on the nature of the identifier, and variations in device types and functionalities.

Many forms of such temporary Proxy and Pxy identifiers may be put to use. These may be targeted for casual or official use depending on the ever changing policies and practices of user organizations and the Government. Examples of casual use include name and identity validation, obtaining a credit score, checking a person's or a company's credit history, establishing a cable or a telephone account, picking up prescriptions, buying insurance, going to a hospital, visiting a doctor's office, and many other applications. Using Pxy identifiers would spare peoples' permanent SSN, EIN, and National Id to be used for use by IRS and some branches of the Government. The exact use of proxy identity-identifiers may later on be regulated by congress in order to create a degree of privacy for citizens, and to provide a level of privacy, control and security to people and organizations at large.

C. Trustee; its Roles and Functions

A private enterprise, a credit bureau, or a mandated governmental agency hereafter referred to as the "trustee" would issue, maintain, and support proxy identifiers for any "owners" of an identifier to pay and apply for one. A trustee issues, safe-keeps, and maintains Proxy and Pxy identifiers through monthly or annual (membership) fees and/or dues.

1. The trustee provides facilities, procedure, and establishes rules and requirements to for people to apply for Proxy and/or Pxy types of identifiers.
2. The trustee shall perform all the necessary maintenance functions. Maintenance shall include making the Proxy identifiers available for use by whoever has the login username and password to the maintenance account.
3. Maintenance shall also include the ability of an owner of a Pxy identifier account to be able to change the triggering-password of an owner's Pxy identifier using an appropriate device that is pre-programmed and approved by the trustee for use with a valid Pxy account with the trustee.
4. In addition, maintenance shall include sufficient facilities comprising hardware, software, telecommunication facilities, and access rights for the owners and processors of proxy identifiers to be able to access their account at least 90 percent of the time.
5. The trustee provides encryption and decryption algorithms, algorithm keys, algorithm rules, and user-Rule Numbers.
6. The trustee and/or its designated contractors, manufacturers, employees, and official delegates design, supply, and distribute devices, memory modules, intelligent and dumb cards, data cartridges, and other hardware, supplies, and software for use for Cell-Phones and other devices and that are needed to make "Pxy identifiers" and to decrypt them for use in accordance with tools, methods and procedure that are specified in this document.
7. A trustee may be one or more license holder credit bureaus functioning as independent or joint operators in order to carry out the functions as described in these specifications.

D. Issuance of Proxy and Pxy Identifiers and the Required Registration Process:

1. A person interested in gaining better control of his/her social security number, or another form of identifier applies to the trustee and registers to obtain Proxy identifiers for the entity of interest. An applicant may alternatively apply and register to receive devices, code, and data necessary for generating Pxy identifiers. See Event Label 1; FIGS. 1, 2, 3 and 4. Please refer to section B of this document to learn about identifier types and specifics.

The application and registration process may be accomplished either through the internet, via the conventional mail, or in combination.

a. Registration using electronic media: This is done through a secure web site or other secure interfaces that the trustee has provided and maintains. An applicant may go to the trustee's web site and apply in person, or he/she may go to a Notary Public's office, or register through an agent. At any case, the electronic application must be completed as specified. The applicant must read and agree to a legally binding document that is referred to as "Terms and Conditions of Use", in accordance with procedures in section 2, below. In addition a signed and certified "Affidavit of Personal Identity", as explained in paragraphs 6 and 7, below must also be mailed to the trustee via recorded-mail or other secure means.

b. In registering by mail, the applicant can either completes all of the forms that have been sent to him/her in the mail, or may download and print the required forms out of the trustee's website. Completed forms along with proper payment and an acceptable "Affidavit of Personal Identity", as explained in items 6 and 7 below, must be sent to the trustee via recorded mail. The applicant must also read and agree to a legally binding "Terms and Conditions of Use" as explained in section 2, below. This can be read from the trustee's web site; a copy of which may also be requested through the mail.

2. In becoming a member, the person will read, comprehend, and agree to legal agreements and conditions of use that is presented on the web site, or are sent to him/her on paper. The agreement and conditions of use are modified from time-to-time. The agreement specifies the role, duties, legal responsibilities, and scope of liabilities pertaining to a trustee organization that is issuing and maintaining Proxy and Pxy identifiers and related "Identity Matrix", data, code, and related modules and/or devices.

3. The person will complete an application form with the requested data that include all or part of the identifier to be registered, along with identifier owner's full name, company name (when applicable), birth or incorporation date and other information as needed by the trustee. Depending on the type of the identifier that is being issued, Proxy and/or Pxy types, the applicant will choose one or more account passwords, and in case of Pxy identifiers several of such pass-codes may be issued to the owner of the identifier in data and code forms that is called "Identity Matrix", as well as the needed hardware/software to process the supplied data and to generate the needed Pxy identifiers.

4. When applying on-line, the registering person reviews all submitted information for accuracy, then goes through checkout and payment process. At the conclusion of this process an on-line screen is displayed to confirm a "Contingent Registration" with issuance of a contingent Proxy identifier of the type requested and/or a customer Id Number, along with an emailed Invoice/Receipt Number acknowledging the pending payments that are made by the applicant.

5. A "Contingent Registration" of a Proxy identifier or a Contingent Pxy Registration will be turned into the "Registered" status only when payments are actually received, and the completed notarized original of "Affidavit of Personal Identity" form is received by the trustee through recorded mail no later than 15 days from the date of the Contingent Registration.

6. The applicant prints a blank "Affidavit of Personal Identity" form from the trustee's web site; or if applying by mail, he/she shall request it through the mail, or will obtain it in a registration/information pack that he/she has received.

7. In satisfying the "Proof of Identity Requirement", the applicant must visit a Notary Public, and/or a legal authority and request the "identifier to be registered", checked, and verified by the legal authority—by presenting one or two acceptable pictured identity documents, at least one of which must be a governmental issued pictured Id, along with a blank "Affidavit of Personal Identity" form (See paragraph 6, above). The form must be completed and signed in the presence of the legal authority notarizing it and optionally witnessed by an adult person if present. The legal authority notarizes and signs the affidavit and places his/her official seal at the foot of the document. An applicant for registering a proxy EIN must present the applicant's own pictured proof of identity, in addition to a certified copy of the official incorporation documents and have the affidavit notarized with an acceptable seal of authority. All such completed forms are to be mailed to the trustee's address via recorded mail.

8. The applicant's last 4 digits of SSN (along with an organization's EIN, when applicable) should be placed on top of the completed "Affidavit of Personal Identity" before it is mailed to the trustee's address. In addition, the contingent registration number and/or Proxy identifier if issued while registering online, needs to be included on the completed application form before it is sent to the trustee.

9. All completed forms and full payment must be received by the trustee within 15 days or less from the date of obtaining a contingent Proxy or Pxy registration number. Otherwise the contingent registration shall be cancelled and all of the payment may not be refundable.

10. The foregoing registration process has been presented as a guide only. These may be changed at any time by the trustee or other license holder(s). Such procedures and the order in which those are documented here would have no bearing on this patent application and any deviation or alteration of such procedures shall not be the cause for invalidating this patent or reason for creating a new one similar in the concepts that are presented here. When different from the above registration procedure, those that are updated and specified on the trustee's web site shall prevail.

E. Using Proxy and Pxy Identity-Identifiers to Authenticate Identity

A third party ("user") organization, like a bank, a credit card company, a business, or a governmental agency that needs to verify the identity of a person, to obtain a credit score, credit, history, or other various background check on a person, another business, or an institution can do so by using a Pxy or Proxy identifiers in lieu of the original/raw identifier such as SSN or EIN (Employer Identification Number, or Federal Tax Number).

Business and organizations can authenticate a person's name or a company's identity in either of two ways:

1. By directly inputting the identity owner's claimed name along with the owner's Proxy or Pxy identifier into the proper screens provided on the trustee's web site or other electronic media, via text input, through a telephone, and by similar methods; or 2. Through a credit bureau by inputting the owner's Proxy or Pxy identifier. This way, a business or a user-organization can obtain all of the subscribed information that is currently provided by credit bureaus through its contractual agreement with the credit bureau, as it did before this invention. See Event Labels 5 & 6 in FIGS. 1, 2, and 3.

The change in procedure, when compared to the status quo, is that the owner will get to keep his/her SSN or other identity identifiers private, and instead will surrender his/her Proxy or the encrypted Pxy form of such identifiers in order to receive services from user companies or organizations. See Event Labels 5 and 6 in FIGS. 1, 2, and 3.

F. The Difference Between Proxy Identity-Identifiers and Pxy Identity-Identifiers The purpose for using either type of the Proxy and Pxy identity-identifiers is for its owner to be able to do business and receive services without having to disclose his/her SSN or business EIN. Proxy and Pxy identity-identifiers are both variable forms of identity-identifiers versus the traditional fixed-for-life identity-identifiers such as SSN, and EIN. To maintain confidentiality, even a Proxy identifier must be changed regularly to maintain its secrecy while maintaining the required functionality and the attribute of being able to reference its parent identifier; namely SSN or EIN.

The difference between a Proxy type of an identifier versus a Pxy identifier is that a Proxy identifier must be changed manually, and regularly by its owner to preserve their anonymity after they are disclosed to one or more users. This is too much of a burden for the identifier owner and also too much record keeping on part of the trustee; hence not so practical. With Pxy type of identifiers, this shortcoming has been corrected. With Pxy identifiers, such a change occurs when the identity owner submits an instance of his/her (i.e. a Pxy) identifier to a merchant, user-company, or-organization. See section G for details.

G. Pxy Identifiers; Concepts, and how they are Made

1. Definitions: A Pxy Identifier is a variable a proxy identifier that is an address ("face" value) of the original ("raw" value) of the identifier it references.
2. Pxy Membership Accounts: An owner of an identifier registers and obtains a Pxy identifier account from a trustee organization by following and fulfilling procedures as outlined in section D, above. See Event Label 1 in FIGS. 2,3, and 4.

Upon membership approval the owners of Pxy identifiers would be given a membership account at the trustee's site with which they can login to change and maintain their Pxy account login-passwords, to view their membership status, and to view e-messages on issues related to their account.

Software driven facilities are also provided for an owner to be able to change his/her account-login-passwords, to retrieve their forgotten account password, and also to reset their Master-Password-Reminder-Phrase that is used for retrieving a forgotten login-account-password.
3. Method for making "Pxy Type" Identifiers: A person with a Pxy type of an account will be assigned a series of Identity Passwords (U.S. patent application Ser. No. 11/129,827 dated May 16, 2005) to use with his/her identity-identifier and/or charge card number. Such identity passwords comprise a part of what had been named "Identity Matrix" as introduced in the said US Patent Application, and U.S. Patent Application Nos. 60/710,693 and 11/506,476 dated Aug. 19, 2006.

In addition to Identity-Passwords, an Identity Matrix houses one or more identity or non-identity identifiers (see section B, above). These two sets of data are stored in memory locations of a portable device or a removable card/memory module cell locations we have named Y-File, and X-File respectively. Identity Matrix is also comprised of another conceptual or physical file named Z-File that can reside outside the boundaries of the physical memory space that is storing the other two (X, and Y) components.

Once a Pxy account is issued to the owner of an identifier, that person receives his/her own Identity Matrix that is preloaded in ROM, RAM, or in magnetic form, with the person's X, and Y components specific to that person (identifier-owner). The issued Identity Matrix is either preloaded, or can be downloaded into memory locations of a cell-phone, PDA, or a potable device of some sort, by using a secure link which is provided by the trustee. If the Identity Matrix is issued in the form of a preloaded cartridge, or plug-able (flash) memory module, the owner can plug it into a specially designed cell phone, PDA, small computer or other device that may also exist at the identifier-user's site. This for example, can be a cash register or a gas pump.

The identity owner specifies what kind of a device they would be using and the trustee works out the proper storage media and/or transfer protocol. The cartridge or memory module contains data as well as executable code or usually a coded reference to it. See FIG. 5.

In an Identity matrix, the X-component houses one or more of the owner identifiers; The Y-component stores one to 370 random passwords; The Z-component comes by asking the identifier-user. The latter comprises numbers or code that references the user-specific-encryption-algorithm and algorithms-keys, called user "Rule No./flag", or simply "Rule-No". As FIG. 5 illustrates, the Y-File of the Identity Matrix contains many passwords that are allocated to the identifier and/or its owner. When used together, elements out of Identity Matrix's X, Y, and Z components (files) shall render a traceable instance of the owner's real SSN, EN, Charge Number, etc. As mentioned before, the Rule-No. is either input by the owner at the user site in order to make a Pxy identifier that is user-specific and not useable elsewhere; even in cases where owner's id is stolen or passed over to another business organization.
4. To summarize, Pxy identifiers are made "on the fly" by the owner (of an identifier to be protected) at a user's site. Following is a summary of the above method that is used to make Pxy identifiers: (it corresponds to step 4 in FIGS. 1, 2, 3, and 4):
    a. A person (the "owner" of an identifier) is given a portable device or a special cell-phone with proper hardware and software. He/she generates a Pxy identifier that is for the sole use of a specific merchant, business, or organization that this Pxy identifier is good for.
    b. The owner's identifier is already stored on the device in a) above. The owner simply enters one of the pre-stored passwords in the device and presses one button to start the process. By doing this the machine automatically retrieves the original value of owner's identifier out of the device memory or from its cartridge, or plug-in memory.
    c. The owner then asks the business (user) for their "Rule No.", and inputs it to the device.
    d. Owner's Pxy identifier is now produced by the device and can now be given to the user or written down in the user's application form. Bear in mind that this identifier is issued just for the (user) merchant/business that is intended for; it is different from the owner's original SSN or other identifier, and cannot be used elsewhere.

Figure 6:
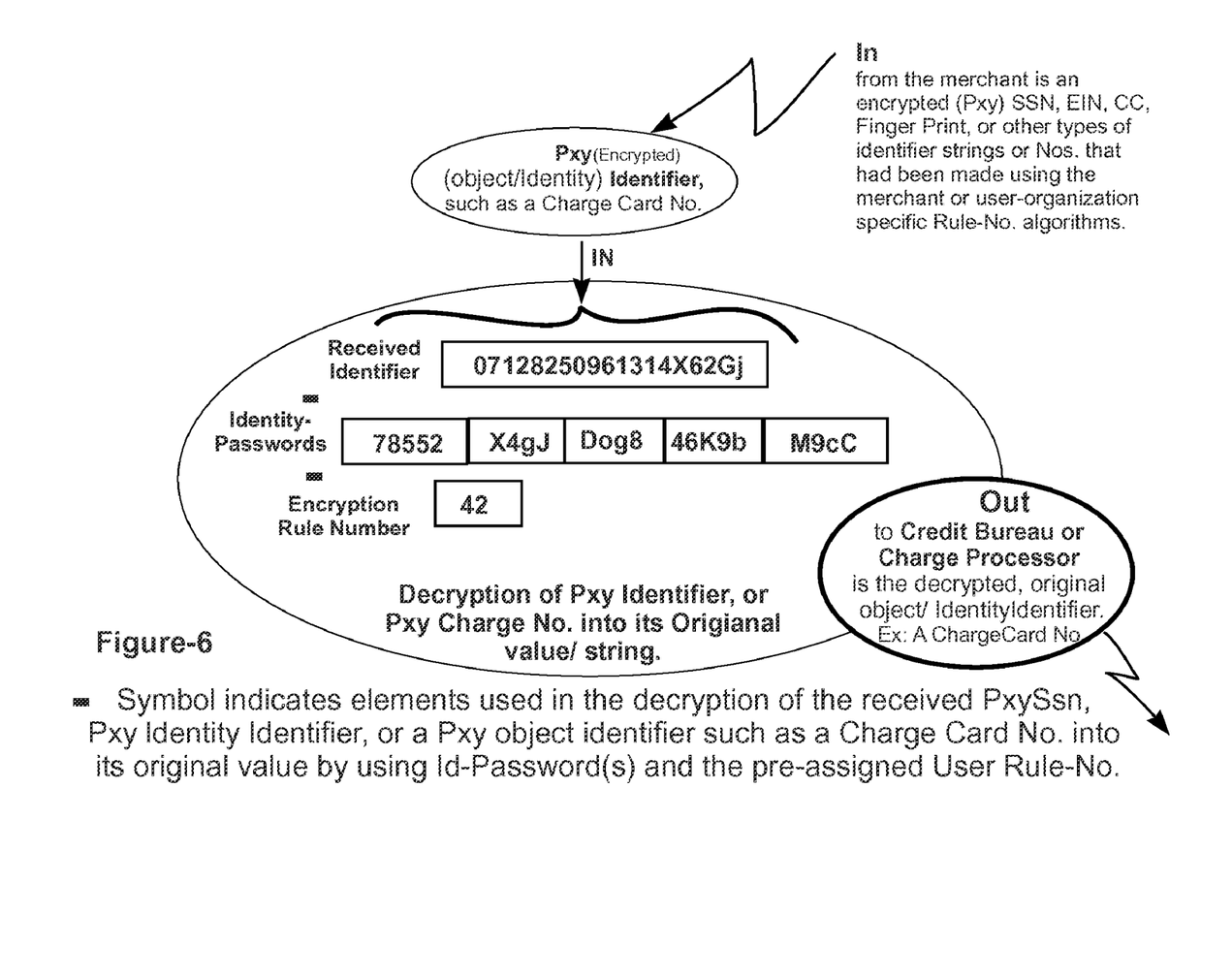
FIG. 6: Process flow diagram representing decryption process by which comprising data elements of a Pxy Identifier is translated back to their original values, using the same Rule Number that was used to encrypt them.

5. Delivery Methods to the User: Other methods of delivery are envisioned to be DTMF telephone tones (for over-the-phone identity-verification), binary/data stream output/signal to be used within a computer of sorts, a cash register, charge device, or in a given visual and/or text pattern and style on a PDA, telephone display, etc. The input/output device can alternatively be provided by the user or merchant in form of a credit card machine, cash register, vending machine of sorts, etc. that the user can input the needed data as outlined above, and to receive a receipt from the device's printer. Such a machine may be fitted to accept owner's plug-able (flash) memory (card) modules containing the owner's Identity Matrix.
6. Areas of Application:
    a. For use as a replacement for identity-identifiers such as SSN, National Id Number, or EIN.
    b. Pxy identifiers can be used for secondary identity-identifiers, as well. These include, but not limited to patient number, insurance number, student Id number, and the like,
    c. Pxy identifiers can be used for Copy Protection Applications in Software usage Licensing (i.e.: a Pxy Dongle, or a Pxy Access Key), a charge card number, an equipment serial number, and so forth.
    d. Other areas of application is when a third party user organization or business would need to authenticate a person's name (or entity) over the phone, or in absence of being able to verify his/her identity card (or other documents) while the person is not present. In such occasions, the person may input his/her Pxy code via a plug-in memory module in a specially made telephone set, PDA, or a computer-like device. The device can transmit the owner's Pxy identifier to the user after which the user's computerized phone can auto-input the user's own Rule No./flag; decrypts and uses the owner's Proxy identifier. This method bars the user's customer-service-person to learn the customer (owner's) identity-identifier (SSN), because it is all processed and used inside the user's computer system automatically without the customer-service-agent being able to hear or see the owner's real identity-identifier. See FIG. 6.
    FIG. 6 shows how a Pxy identifier can be decrypted back to its original value.

H. Handling of Algorithms, Algorithm Keys, and Encryption Code

As discussed in the above sections, user specific Rule-Numbers specify a certain algorithms, and algorithm keys to be used to encrypt the original value of an identifier into its Pxy form in order to hide the original identifier from its users. For this reason:
a. All algorithms' code should stay strictly secret, as trustee's property and within its domain. Only a reference number (Rule-No.) should be given to each pertinent user. Any such algorithm code and/or design may only be given to some processing entities such as credit bureaus and charge card processors upon written contract with the trustee.
b. The trustee's programmer has to design many algorithms and as much variety in architecture design in order to provide many businesses, merchants, organizations and many types of business users of identity-identifiers and identifiers with diverse algorithms.
c. All such code and clues to algorithm architecture must remain secret. Any lead to its design will give a strong lead in breaking the design of one or more possible algorithms.
d. Any public give-away of one or more algorithms shall reduce the variety in class, and ultimately in number of available algorithms. For this reason a full code of such an algorithm is not possible as part of this application.
e. Ample use of as many owner-specific random identifier-passwords should be made in the encryption process, not to have to rely upon algorithm design by itself. This is to make any reverse code engineering much harder to do, if the latter would be of concern to the trustee.

I. Entities

Four classes of entities need to exist:
1. An identifier owner who turns out to be a person. Examples are an "owner" of a SSN, an executer of an EIN, or another type of an identifier. This is a person who decides to register and want to use a Proxy or a Pxy type of an identifier.
2. A trustee: An agency, a business, a government agency or an organization to issue, register, handle, maintain, and support Proxy, Pxy, in addition to the design and issuance of processing algorithms, Keys, and data that goes into masking such identifiers.
3. A merchant, business, government agency, or a "user" organization that requests and intends to use an identity-identifier for information, history, risk analysis, or improvement of its business practices, services, and other business related reasons. Examples are banks, issuers of credit, insurance companies, government agencies, schools, hospitals, doctors, car dealers, drug stores, and almost any private or public business out there. These are called "users" throughout this document.
4. One or more credit bureaus/agencies. This entity collects, compiles, and sells information on people, companies, and other "users" and releases parts and batches of such information to "users" described in section 3, above, or uses a collection of such information to offer businesses other business statistics and advisory reports.
    There can be other type of non-obvious entities. For example, in case of a charge card as an identifier, this entity would be a "charge processing" entity, a credit card company, or a bank. In case of a protected entrance door this would be a computerized system that decrypts and validates the code of a door opener, and lets a person in. Numerous other scenarios also exist that is outside the scopes of this document.

J. Modes of Operation

FIGS. 1, 2, 3, and 4 represent the four modes of possible operation for processing identity-identifiers. These are:
1. Mode-1: Authentication of identity is done through a "trustee". A trustee registers, maintains and generates un-encrypted Proxy identity-identifiers, and passes a Proxy identity-identifier types of a person or a company to the credit bureau. The trustee also sends any new or updated list of such Proxy identifiers to credit bureaus based on a contract and working relationship. Credit bureaus then cross-reference the Proxy identities of people with their already on-file SSN and EIN numbers, and would fill-in their client information requests and orders using these Proxy values instead. This is represented by the process flow diagram of FIG. 1.
2. In Mode 2 a trustee issues and maintains both or either of Proxy and Pxy types of identifiers. Therefore the trustee also designs, distributes, maintains, and updates all of user-specific-encryption and decryption keys and algorithms necessary for the operation of Pxy type of identifiers. See the process flow diagram of FIG. 2. In this mode Pxy types of identifier are produced and are also passed on to the credit bureau(s), instead of the Proxy types in Mode 1, above.

3. In Mode 3, the trustee in Mode 1 or 2 above is taken out of the picture process and a credit bureau itself takes up the role of the trustee and handles registration, identity verification, issuance, support, and maintenance of Proxy and/or Pxy identifiers itself and/or through its own subsidiaries or contractors. In this mode, the credit bureau and/or its agents maintain, update, and cross-reference all Proxy and/or Pxy identifiers as well as the design and distribution of all of the needed software and hardware on its own, through its subsidiaries, and/or its affiliates and contractors. See the process flow diagram of FIG. 3.

4. All above 3 modes of operation can also be applied to processing a charge account, credit, and/or debit card numbers. FIG. 4 represents a flow diagram analogous to mode 2, above. The difference of this mode with previous modes is that a Charge Processing Company, a bank, or a credit card company (as entity) replaces a credit bureau (as the entity). Inclusion of flow diagrams for the application of charge numbers as an entity, or any other entity for this matter, would closely resemble those flow charts included already.

As mentioned before, these modes of operation can vary according to the identifier to be processed and the needed entities. The above have been documented to solely portray "working models".

K. Procedure and Methodology Using Proxy and Pxy Identifiers

Figure 1:
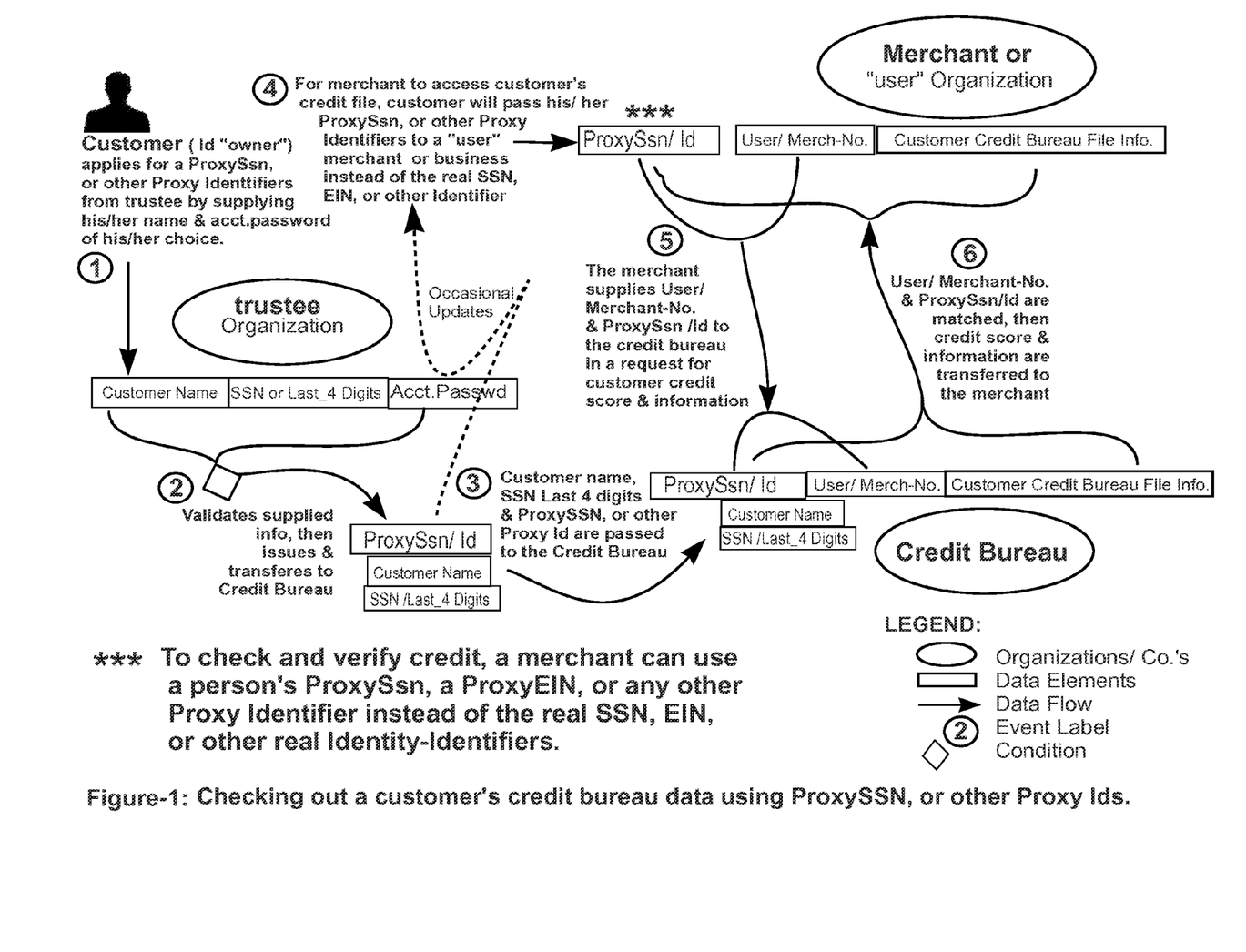
FIG. 1: Process flow diagram for checking out a customer's credit bureau data through using a Proxy identity-identifier. The same logic can be applied to other Proxy types of identifiers as a way to hide the "face" of the original identifier.
Figure 2:
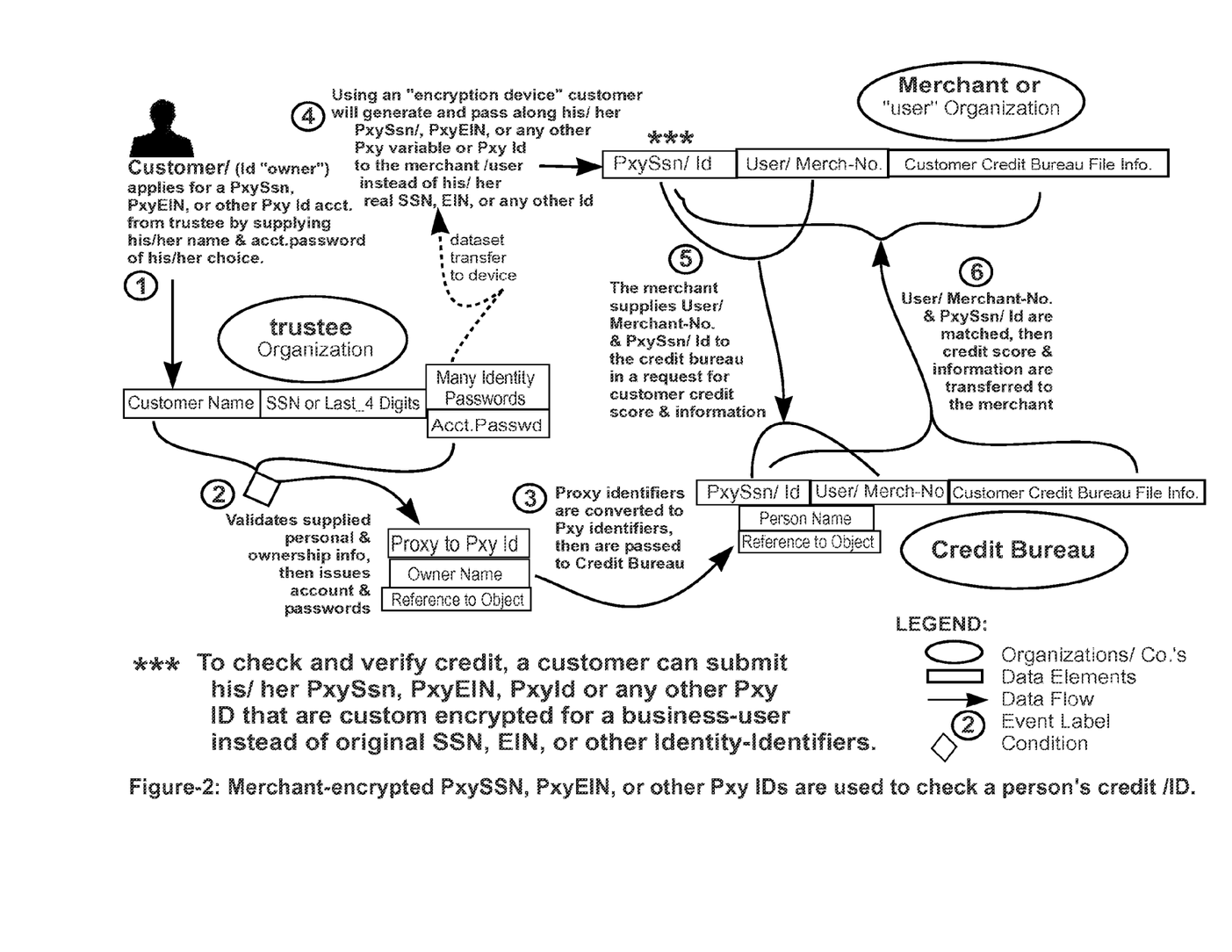
FIG. 2: Process flow diagram by which a merchant-encrypted PxySsn or other "Pxy type identifiers" are used to check a customer's credit score, history, financial and other personal data credit bureaus hold. The same logic can be applied to any Pxy type of identifiers as a way to hide the "face" of the original identifier.
Figure 3:
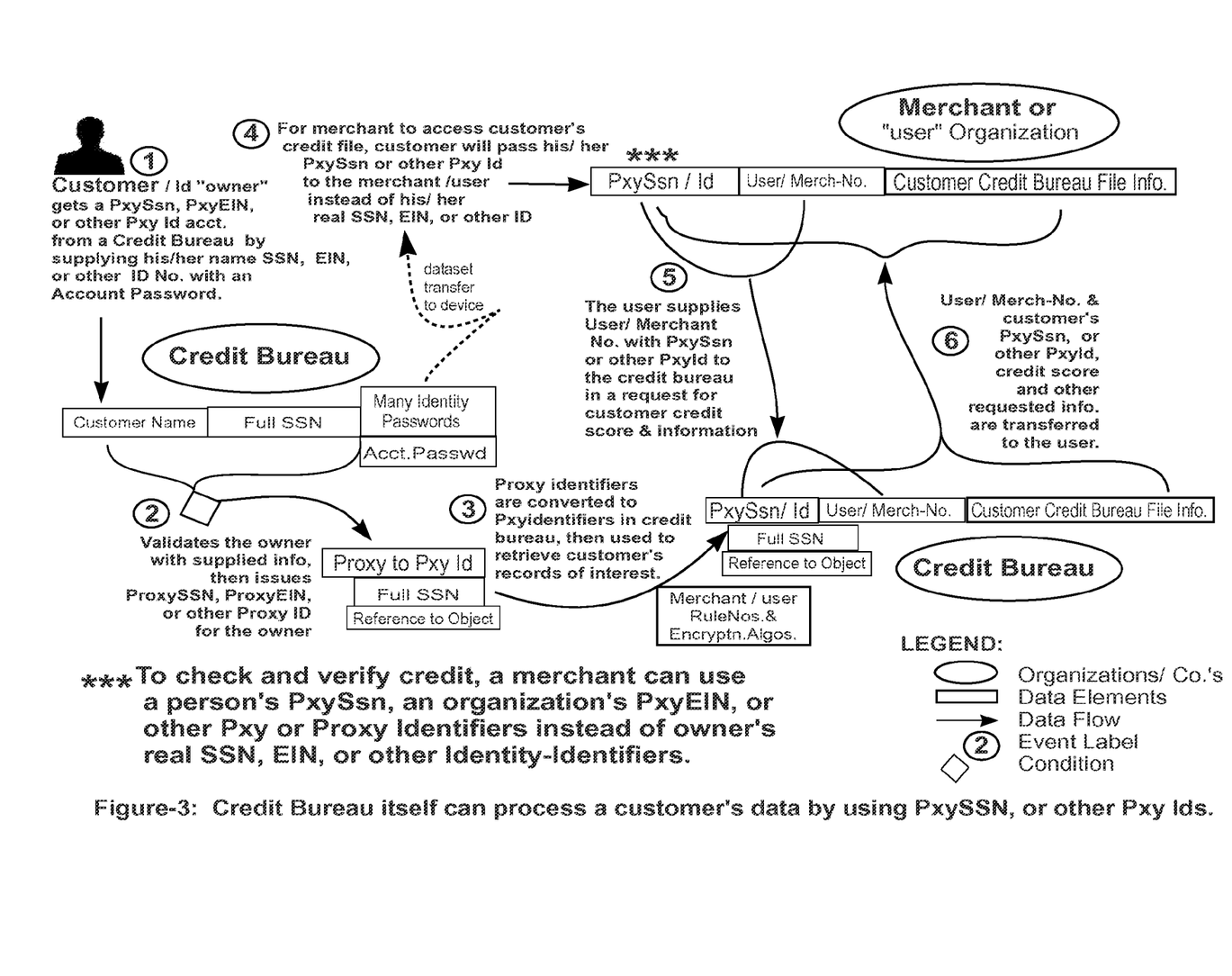
FIG. 3: Process flow diagram by which a credit bureau by itself can accomplish those functions that were specified for the "trustee" in FIG. 1 and FIG. 2. Here, a credit bureau takes charge of all functions by itself and/or through its own subsidiaries.

In this document we are presenting the flow of information as presented in FIG. 1, FIG. 2, and FIG. 3 that are special case variations of the process data flow of FIG. 1, and FIG. 2. The inventor believes that understanding of FIG. 1 would easily lead to the comprehension of the processes in FIG. 2, FIG. 3, and FIG. 4 as well, since these are very similar to FIG. 1 in concept. Therefore here we sufficed to only describe FIG. 1.

As specified in section J above, the information flow of FIG. 4 deals with a rather different type of an identifier; that is, a charge number as a hidden entity. Therefore we devote an extra paragraph to clarify the minor difference and let the 4 different procedures that are presented here to serve as various other possible implementation models. Our objective is to communicate the main concept behind the invention with as much procedure to clarify one or more sample implementations, and to also to show that the concepts are practical, workable, viable, and useful.

Note:

In order to help understand the flow of information in a better and clearer manner, we base the following description and portray a person (as customer), with a Social Security Number (as identifier) he/she wants to protect; the dealership (as the user). The task would be to obtain a credit score from the credit bureau they are working with. Event numbers are drawn in small circles on the diagrams (FIG. 1). Description of events follow:

1. FIG. 1; Event 1: Customer contacts the trustee that is issuing Proxy SSN (and/or PxySsn); registers, and pays to obtain a Proxy SSN. The customer follows the procedure similar to those outlined in section D of this document.
2. FIG. 1; Event 2: The trustee verifies the customer's application form, makes sure the customer's full information is correct and makes sure the person is indeed who he/she claims to be. Upon confirmation of identity and receipt of payment, the trustee issues a ProxySsn for the customer's use. Of course customer understands that he/she can change their ProxySsn for use with other types of businesses (say a bank), or as often as they feel it is necessary.
3. FIG. 1; Event 3: Based on a contractual arrangement, trustee's organization passes on this new, along with all the changed ProxySsns to credit bureaus it works with on regular (hourly, nightly, or in real-time) basis. At this point, a credit bureau would have two data elements on the customer; customer's ProxySsn (that was passed on from the trustee), and customer's name and real SSN that the credit bureau has on its files.
    3a. Credit bureau cross references the two "keys", in a new table they have created for this purpose. In such a table ProxySsns are "related" to the real SSNs. As any database programmer knows, access to all other information lookups takes place as usual having established this relationship between the new key (ProxySsn) and the old lookup key (SSN).
4. FIG. 1; Event 4: Having a valid ProxySsn at works, the customer in the car dealership fills in the dealer's application form and gives out his/her ProxySsn in lieu of his/her SSN; thus protecting it from sales agents and others.
5. FIG. 1; Event 5: The car dealership/salesperson submits a credit (score) check request to the credit bureau they work with. Of course this bureau must also be in contract with the trustee to be able to accept a ProxySsn instead of the customer's SSN (current situation). In this request the dealer includes its Merchant No., name, and whatever else they submitted before this invention.
6. FIG. 1; Event 6: When credit bureau receives the submitted customer ProxySsn and other information, ProxySsn hits the cross-referenced table described in paragraph 3, above; from it, retrieves the customer's SSN, extracts the requested information for the dealer (excluding customer's SSN, not to defeat the purpose of this whole invention), and passes the requested information back to the dealership.

L. The Purpose of the Invention and its Uses

The invention opens a way for people to keep their identity identifiers confidential while allowing the business to do its part and provide services to their clients. This way the people can receive services from those companies, institutions, and organizations without risking their original/real SSN, EIN, charge card number, and the like to institutional employees, customer service agents, contractors and affiliates. The invention teaches that this can be done in two ways:

a) By supplying what we call a Proxy value for the identifier they want to protect; or
b) By giving out an encrypted instance of the identifier they seek to keep confidential. The latter versions have been named by the inventor as a "Pxy" types of identifiers. See section B.

A Pxy type of an identifier is a "face" of an identifier value that is different for the same value depending on which business user, vendor, it is intended for and tailored to. Due to such a design, the same SSN would be different for the same person in a different user organization. For example, a social security with the original value of "562 178 910" would be handled in the "X-Bank" with the Pxy (face) value of 926508Q01 while the same person would have a substitution PxySsn of 101N87326 in the "Y-Bank".

This prevents bare and unprotected form of such our identifiers from being written down, recorded, and be used for many years by rank and file employees of such user organizations, their affiliates, and subsidiaries.

Buy using a person's PxySsn, or PxyEIN the person's original identifier does not get around, stays; within a given business or institution, but the business purpose is still maintained. User companies will be able to respect customer's privacy and security, and the instances of unauthorized use and identity theft will eventually go away.

I claim:

1. A four way method for authenticating to a third party a person's ownership of an object, the method comprising the steps of:

a trustee performing the steps comprising:
   verifying a name and at least one identity-identifier of the person;
   verifying said object as being uniquely identifiable through an object identifier;
   verifying said person as being the owner of said object and said object identifier;
   upon a positive authentication of proof of ownership, declaring said person as object owner and enrolling said object owner name associated with said object identifier in a computer system of the trustee by issuing one password;
   issuing a data-set comprising at least one identity-password and at least one proxy-identifier associated with said object identifier;
   storing said data-set in at least one of a plug-in memory, a card, or a portable electronic device;
   delivering said data-set to said object owner through secure means;
   associating and storing in the computer of the trustee said object identifier, the at least one proxy-identifier, the at least one identity-password, and said object owner name;
   accepting and enrolling at least one of a third party business or an organization user of identity-identifiers as a third party and a user group member;
   programming a plurality of different encryption rules and referencing each one of said encryption rule with a rule number allocated to each of said third party;
   assigning each one of said rule and rule number to at least one of said third party;
   associating and storing each of said rule and rule number with a name of said third party in a file;
   customizing and storing one of said rule number with its associated rule in at least one Read-Only-Memory (ROM) embedded in at least one digital peripheral processor equipped with a keypad;
   delivering said digital peripheral processor and ROM contents to said third party via secure means;
   generating a first encrypted-proxy-identifier by applying a third party rule to at least one of the object owner's proxy-identifier with at least one of said identity-password;
   securely delivering to a credit bureau's computer system said first encrypted-proxy-identifier, said object identifier, and said object owner name;
   authenticating a person's entitlement to the object;
the third party performing the steps comprising:
   attaching and configuring said digital peripheral processor to a computer system of said third party;
   informing said person of said rule number;
   said person generating a second encrypted-proxy-identifier by applying the rule number of the third party to at least one of said proxy-identifier and at least one of said identity-password using said data-set;
   transferring the generated second encrypted-proxy-identifier to said third party computer system;
   the third party transmitting its own merchant number and its own merchant name along with the second encrypted-proxy-identifier to a credit bureau;
the credit bureau performing the steps comprising:
   receiving the first encrypted-proxy-identifier, said object identifier, and said object owner name from the trustee;
   receiving the third party's merchant number, the merchant name, and the second encrypted-proxy-identifier;
   comparing the first encrypted-proxy-identifier with the second encrypted-proxy-identifier; and
   upon a positive match of the first encrypted-proxy-identifier with the second encrypted-proxy-identifier,
   retrieving said object identifier and said object owner name associated with the first encrypted-proxy-identifier,
   retrieving a proprietary credit bureau owned information upon a positive match of the said object identifier and said object owner name,
   extracting at least one of the merchant number or the merchant name, and
   providing the third party with said object owner name and the proprietary credit bureau information, excluding the object identifier.

2. The method of claim 1, further comprising: the credit bureau registering and enrolling with the trustee.

3. The method of claim 1, further comprising: the trustee assigning and issuing a different rule number and associated encryption rule to one or more of said third party.

4. The method of claim 1, wherein: said object is one of a person, a business, a corporation, or an organization.

5. The method of claim 1, wherein: said object identifier is at least one or more of an alphanumeric or digital representation of at least one of fixed-for-life-identity-identifiers, including at least one of an organization's Employer Identification Number (EIN), Tax Identification Number, a person's social security number, fingerprint, iris pattern, earlobe pattern, DNA structure, biometric information, or other fixed-for-life unique identifier.

6. The method of claim 1, wherein: said object identifier is at least one of an alphanumeric or digital representation of a semi-fixed personal identifier including at least one of a person's signature, picture, debit card account number, charge card account number, driver's license number, patient number, insurance number, student number, log-on user name, access code, software license number, a fixed identifier, or semi-fixed identifier.

7. The method of claim 1, wherein: said object identifier is at least one of an access code, a serial-number, an identity-verifier, or an identifier comprising: object usage rights, rights of ownership, authority, or privilege of various degrees wherein said usage rights or rights of ownership have been allocated through at least one of said object owner.

8. The method of claim 1, further comprising the steps of entering at least one password, and said person generating said second encrypted-proxy-identifier by applying at least one of an encryption rule associated with said rule number of said third party to at least one of the proxy-identifier and at least one of said identity-password of at least zero in length.

9. The method of claim 1, wherein: after entering a valid password, said person initiates the delivery of said second encrypted-proxy-identifier to either of said trustee or said third party computer system from one of: the plug-in memory, a card, or an electronic device.

10. The method of claim 1, wherein: after entering a valid password, said person generates said second encrypted-proxy-identifier utilizing one of: a cell phone, a computer, or an electronic device; and transferring said second encrypted-proxy-identifier to one of said trustee or said third party computer system.

11. The method of claim 1, wherein: after entering a valid password, said person transfers to one of said trustee or said third party computer system said second encrypted-proxy-identifier from at least one of: a smart card, RFID (Radio-Frequency Identification Device), or other data storage device.

12. The method of claim 1, wherein: after entering at least one valid password, said person retrieves the at least one of said proxy-identifier from a plurality of proxy-identifiers associated with said object identifier and generates said second encrypted-proxy-identifier through an interface of said trustee computer.

13. The method of claim 1, wherein: said person transmitting at least one of said proxy-identifier, a valid password, and the rule number to the trustee, after which, the trustee transmits an authenticated instance of an encrypted object identifier to said third party.

14. The method of claim 1, wherein: said person sending an encrypted instance of the one of said proxy-identifier to either one of said trustee or said third party where the person is not physically present at a location of the third party.

15. The method of claim 1, further comprising: issuing a plurality of proxy-identifiers to the object owner wherein the proxy-identifiers are each associated with: said object identifier associated with said owner and at least one of said identity-password of at least zero in length.

16. The method of claim 1, wherein: a plurality of said proxy-identifiers wherein each one of said proxy-identifier comprises at least one password of at least zero in length, and at least one of said rule number, wherein each one of said proxy-identifier is associated with at least one of said object identifier.

17. The method of claim 1, wherein: a plurality of said proxy-identifiers each comprise one of said identity-password of at least zero in length and at least one object identifier, wherein each proxy-identifier is associated with at least one of said third party rule number.

18. The method of claim 1, wherein: the trustee decrypting said first encrypted-proxy-identifier and said second encrypted-proxy-identifier to original binaries through programming a reverse algorithm associated with the rule number used in encrypting said first encrypted-proxy-identifier and said second encrypted-proxy-identifier.

19. The method of claim 1, wherein: the credit bureau further performs functions of the trustee.

20. The method of claim 1, wherein: the trustee further performs functions of the credit bureau.

21. The method of claim 1, wherein: the at least one of said proxy-identifier further comprises at least one character where the character is from the UTF (Unicode Transformation Format) international character set and said identity-password further comprises at least one character where the character is from the UTF international character set.

22. The method of claim 1, wherein: an encrypted instance of said object-identifier is used in lieu of one of the said proxy-identifier of said object.

23. The method of claim 1, wherein: said object owner is one of a corporation, a business, an organization, or a computer that owns said object, where said object is a data object.

24. The method of claim 1, wherein: said identity-password has a minimum length of zero and a maximum length of 16,777,216 terabytes.

25. The method of claim 1, wherein: said first encrypted-proxy-identifier is one of: an encrypted object identifier or one of an encrypted proxy-identifier; and said second encrypted-proxy-identifier is one of: an encrypted object identifier or one of an encrypted proxy-identifier.

26. The method of claim 1, further comprising: said third party peripheral processor comprising said ROM (Read Only Memory) wherein said ROM is pre-programmed and custom designed by said trustee to process the at least one of said proxy-identifier, said identity-password, and an encryption rule where the encryption rule is associated with a rule number.

* * * * *